March 20, 1945.　　　　R. W. AUXIER　　　2,372,048
PHENOLIC RESIN EMBODYING GLASS FIBERS
Filed June 27, 1941
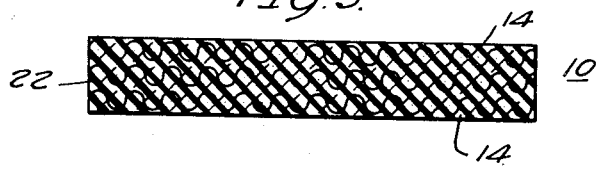
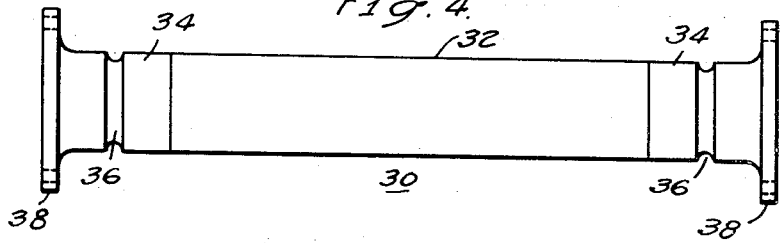
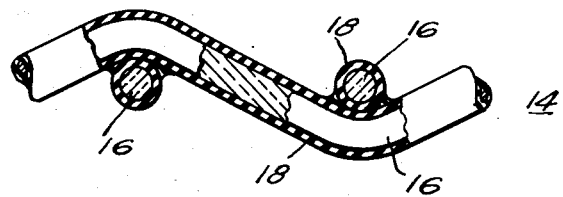
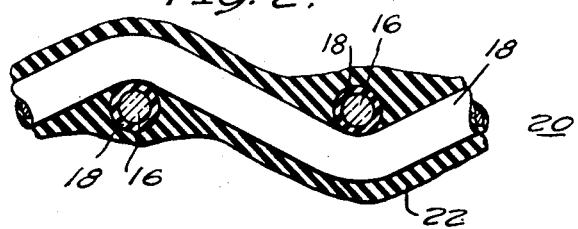
INVENTOR
Robert W. Auxier Patented Mar. 20, 1945

2,372,048

UNITED STATES PATENT OFFICE 2,372,048

PHENOLIC RESIN EMBODYING GLASS FIBERS

Robert W. Auxier, Forest Hills, Pa., assignor to Westinghouse Electric & Manufacturing Company, East Pittsburgh, Pa., a corporation of Pennsylvania Application June 27, 1941, Serial No. 400,038

15 Claims. (Cl. 154—2.6)

This invention relates to the manufacture of phenol formaldehyde resins carrying fiber glass strengthening filler.

More particularly, this invention relates to a particular mode of bonding fine glass fibers to a surrounding mass of phenol formaldehyde type resins to produce a material having high strength and high impact value.

It has been desirable to employ glass fibers of a diameter of less than 0.002 inch as a strengthening inorganic filler for phenolic type resins. Glass fibers of this diameter have characteristics of great flexibility and strength, as well as resistance to chemical reagents. However, when glass fibers have been introduced into phenolic resins, the surprising discovery has been made that the strength of the combined material is considerably less than that of the phenolic resin provided with a filler such as ordinary cotton filler. When subjected to electrical tests the dielectric properties of the resin embodying glass fibers have been considerably less than that obtained with other materials.

An examination of the phenolic resin embodying glass fibers has disclosed that ordinary phenolic resin generally does not bond to glass. In such a case, the glass fibers are present simply as a separate, inert material which does not contribute materially to the strength of the resin. In addition, it has been discovered that the glass fiber containing resin lacks good tensile and impact strength, due to the fact that the stresses are not evenly distributed among the total number of glass fiber. Applied stresses are taken up by a few fibers at a time which rupture before other fibers are stressed, and consequently, the total strength of the material is not developed. In addition to lack of strength, due to the lack of a good bond between the resin and the glass fibers, moisture readily penetrates and greatly reduces the dielectric resistance of the material. It has been found for these reasons, that the introduction of glass fibers by the ordinary prior art practice does not produce satisfactory results.

The object of this invention is to provide for the bonding of glass fibers to phenolic type resins.

A further object of the invention is to provide for bonding resinous materials to glass fibers to consolidate the whole into a body having sufficient elasticity to effect a distribution of stresses.

An additional object of the invention is to provide for bonding resins to glass fibers in a manner to give the resulting material capacity to distribute applied stresses substantially evenly throughout the body.

Other objects of the invention will, in part, be obvious and will, in part, appear hereinafter in the specification and claims.

Other objects of this invention will become apparent from the following description when taken in conjunction with the accompanying drawing, in which:

Figure 1 is a greatly enlarged fragmentary sectional view of a precoated glass fabric;

Fig. 2 is a greatly enlarged view partly in section, of a resin impregnated sheet;

Fig. 3 is a sectional view through a molded laminated resin; and

Fig. 4 is a view in elevation of a member embodying phenolic resin and glass fibers.

According to this invention, glass fibers are precoated in order to impart characteristics to them whereby they may bond with phenolic type resins. Briefly, the process consists in coating the glass fibers with an elastic modified phenolic resin which bonds to the glass fibers. Thereafter, the coated glass fibers are impregnated with any phenolic type resin and the impregnated glass fibers are consolidated therewith under pressure and temperature into a homogeneous body of predetermined shape.

In order to produce a high strength material from glass fibers and the phenolic resin, it has been found that the glass fiber should be the so-called continuous filament fiber glass. A great difference in the tensile strength and other characteristics of the material is secured by employing continuous filament fiber glass, as compared to staple fiber glass material. Staple fiber glass consists of short lengths of the glass filaments of an average diameter of 0.00025 inch combined into a thread, or other form of material, which lacks good cohesion and strength since it is composed of smooth surfaced short lengths. When subjected to tensile tests, the separate short lengths of filament readily separate from each other at low stresses. Continuous filaments of glass, on the other hand, when bonded to the phenolic resin, will withstand large loads until the ultimate strength of the glass fibers has been reached and actual rupture occurs.

In employing continuous filament fiber glass, various bodies of the fibers, such as woven, knitted, felted, and braided material may be used for the purpose of this invention. For most purposes, glass fiber woven into sheet fabric has been found to be conducive of the best results. Continuous filament fiber glass in the form of sheets of cloth is easily precoated with the elastic bonding resin layer and subsequently impregnated with the phenolic resin. Composite structures built up of a plurality of impregnated sheets of glass cloth are quickly and economically made by assembling a plurality of sheets and molding under pressure and temperature.

In weaving continuous filaments of fiber glass into a cloth, the producer applies a coating of some material, particularly starch, in order to minimize the frictional resistance of the glass fibers to the operation. The starch is necessary in order to successfully produce a woven material. The presence of a coating such as starch on the continuous filaments, is detrimental to the production of a well bonded composite phenolic resin-glass fiber material, since the starch tends to cause a poor bond between resin and the glass. In addition, amylaceous materials are hygroscopic, whereby moisture is rapidly entrained into the fibers. It should be mentioned in this connection that the threads from which glass fiber cloth and the like is woven, generally consist of a large number, for example, 102, separate filaments of an average diameter of 0.00025 inch twisted together into a single thread. The starch coating between the filaments, while relatively thin, constitutes a significant factor within such a bundle of 102 filaments. This bundle of filaments with the hygroscopic starch coating acts as a conduit for moisture penetration into a composite resin material. Accordingly, it is desirable to prevent the starch layer from functioning in this manner.

It is important to precoat the glass fibers with a material which will penetrate between the filaments in each fiber and bond to the glass in spite of the presence of the quantity of starch or other filler normally present thereon. When a successful pretreatment coating has been applied to the glass fibers, the starch granules will be completely surrounded by the resin and will be incapable of absorbing moisture.

A precoating material which has the characteristics of forming a tightly adhering bond to the glass fibers, as well as possessing a considerable degree of elasticity in order to distribute stresses between threads and filaments of glass fiber, consists of an oil modified phenol aldehyde type resin. The oil in the resin imparts a great degree of elasticity thereto, and in addition, imparts to the phenol aldehyde type resin the characteristics of bonding to glass. For example, unmodified phenol-aldehyde type resins will not adhere to glass beakers while oil modified resin adheres sufficiently to crack the glass into adherent pieces on shrinking. Furthermore, it has been found desirable to embody a plasticizer to the oil modified phenol aldehyde resin in order to produce a much more elastic coating on the glass fibers whereby the best stress distribution between filaments, fibers and resin body is obtained.

An oil modified phenol aldehyde resin may be prepared from a base consisting of any of the well-known phenolic hydrocarbons, such as phenol, cresol, xylenol, and the like. The most convenient form of aldehyde to use is a 40% solution of formaldehyde. Other aldehydes are known to the art and may be employed in producing the resin as desired.

The preferred oily material for modifying the phenol aldehyde is tung oil. In addition to tung oil, other oils having similar properties may be used, such as oiticica oil and the like. The quantity of tung oil or its equivalent is based on the phenol content of the resin and may be varied from 10% of the phenol content at which proportion its desired effects are noticeably appreciable to as much as 100% of the phenol content, or even more.

The following example is given as illustrative of the preparation of an oil modified resin which may be used for the purpose of this invention. 100 parts of cresylic acid, 35 parts of tung oil, and 71 parts of 40% formaldehyde are placed within a closed reaction vessel with an alkaline catalyst, for example, 0.05 to 0.2 part of calcium hydroxide. The mixture is reacted for several hours at a temperature below 100° C. At the end of this time, vacuum is applied to withdraw water from the mixture. The temperature may be elevated to cause the reaction to proceed to completion. At the termination of this period, a quantity of toluene or other solvent for phenolic resins is introduced into the reaction vessel in order to terminate the reaction. After stirring for a short while, the entire contents will be in solution and the resin may be removed from the vessel. The resin solution may be applied to glass cloth to produce a precoating of the characteristics described.

A plasticizer may be added to the oil modified phenolic resin during reaction or after the resin is in solution. A common plasticizer for this purpose is diamyl phthalate. Up to 15% of diamyl phthalate may be added to the phenolic resin with good results. In some cases, where an extremely elastic coating is desired, larger quantities of plasticizer may be added. Other plasticizers than diamyl phthalate, such, for example, as dibutyl phthalate and tricresyl phosphate, have produced good results for this purpose.

The final resin may be prepared from two to six parts of phenolic, from 10% to a full equivalent of the phenol content of tung oil or other oil, and from 1 to 5 parts of 40% formaldehyde solution or its equivalent. Resins produced within this range of compositions have properties which render them useful as a precoating agent for fiber glass material.

Figures 1, 2, and 3 show the successive stages in the preparation of the product in the practice of this invention.

Referring to Fig. 1 of the drawing, there is illustrated in a greatly enlarged fragmentary view precoated woven material 14 consisting of glass fibers 16 comprising about 102 continuous filaments and a precoating 18 of the oil modified resin applied thereto. The solution of oil modified resin is believed to penetrate into the bundle of continuous filaments and to coat each filament with resin. The solvent is evaporated, leaving a tightly adherent and highly elastic resinous precoating over the fabric material. The precoated material 14 may be subsequently impregnated with the usual phenolic type resins suitable for molding.

The oil modified phenolic resin is compatible with and bonds to practically any type of phenolic resin which may be applied thereover. No particular composition of such phenolic resin is here disclosed since these resins are well known to the art. For instance, the tung oil may be left out of the specific example above given. The phenolic type resins which are suitable for this purpose are known to the art as molding type phenol aldehyde resins, though casting phenolics could also be employed. They are generally prepared in a manner similar to the oil modified resin example above detailed. Fabric material previously coated with the oil modified phenol-aldehyde resin is conveniently impregnated therewith from a solution. The material 14 of Fig. 1 may be conveniently impregnated with the molding phenolic resin by dipping the fabric into the solution of resin and passing through a heated chamber to evaporate the solvent. A plurality of dips or impregnations may be employed to deposit any desired quantity of phenolic resin upon the fabric.

After such impregnation, the material will appear as shown in Fig. 2. The impregnated fabric 20 consists of continuous filaments assembled into threads 16, a relatively thin precoating 18 of the elastic oil modified resin and a larger quantity of the unmodified phenol aldehyde molding resin 22. The fabric as shown in Fig. 2 is suitable for combination with a plurality of other sheets to form a composite block or sheet of any predetermined size or shape.

As shown in Fig. 3 of the drawing, the molded block 10 consists of a plurality of layers 14 of glass cloth carrying a distribution of oil modified phenolic resin upon all of the threads of fiber glass. The main body of the molded unit 10 consists of the molding resin 22.

It is believed that the member 10 of Fig. 3 possesses unusual mechanical properties due to the presence of the elastic bonded precoating 18. When the member is subjected to stresses, the elastic precoating stretches or gives when any one filament or fiber is more highly stressed than adjacent filaments and fibers. By this mechanism, stresses are distributed to a great majority or even substantially all of the continuous filaments in substantially similar amounts. It will be appreciated that a great degree of slack between sheets of glass cloth or fibers cannot be taken up by the precoating. However, the stress distribution is sufficient to impart great strength to the composite member. It should be emphasized that this effect is in addition to a good resin to glass bond which results in a distribution of stresses from the resin to the fibers of glass.

Various proportions of the oil modified resin and the molding type phenol aldehyde resin may be applied to the fibers. In one case, a quantity of oil modified resin equivalent to 28% of the weight of the uncoated glass fabric was applied as a precoating layer, and thereafter an unmodified phenol aldehyde resin was added in sufficient quantity to bring the total resin content up to 90% of the weight of the glass fibers. This produced a composite material having a tensile strength of 38,300 pounds. When tested for bond strength, such material exhibited bond strength values of 1460 to 1480 lbs. measured on a sample ½" by 1".

Another material was prepared with a precoating of oil modified resin equivalent to 33% of the weight of the glass fiber and sufficient unmodified phenolic resin of the molding type to bring the total resin content to 73% of the weight of the glass fiber weight and a tensile strength of from 37,100 to 40,900 lbs. per square inch was obtained. The bond strength of this latter type of member was 1240 lbs.

A further change in the proportion of resin to the glass cloth was produced by employing a precoating layer amounting to 30% of the weight of the glass cloth and sufficient unmodified resin to bring the total resin content to 42% of the weight of the glass cloth. This last material exhibited an ultimate tensile strength of from 33,800 lbs. to 48,800 lbs. per square inch and some samples exhibited ultimate tensile values of up to 50,000 lbs. per square inch. The bond strength of this last material was approximately 1000 lbs.

The tensile tests of laminated fiber glass members disclosed a further unexpected feature of the material. The plot of the stress-strain points fell along a substantially straight line up to nearly the ultimate tensile stress for all sample tests. This indicates that the material follows Hooke's law and is elastic for nearly the full strength range. No other phenolic resin, in fact no known synthetic resin, displays this particular property. Such elasticity renders the material very useful for many purposes.

When the three materials above listed were immersed in water for 24 hours, the following absorption of moisture values resulted. For the first material 0.64% to 0.87%; for the second material, 0.58% to 0.88%. The last-mentioned material had a moisture absorption of 0.52% to 0.54%. Within this range of moisture absorption values, the electrical resistance was well within requirements being desirable for electrical purposes.

The quantity of precoating resin may be varied from 3% of the weight of the fiber glass up to 50%, or even more. Unmodified resin may be added thereafter in any amount required. An all oil-modified resin and glass cloth member has been prepared for use in some cases. The tensile tests of the all oil-modified resin-fiber glass material have given tensile values of 36,300 lbs. per square inch. The bond strength has been in the neighborhood of from 700 to 800 lbs. for 1" by ½" members. The moisture absorption has remained within the limits obtained for the combination of resins.

The sheets of Fig. 3 may be prepared by molding at temperatures of from 140° C. to 190° C. or higher, at pressures varying from 1000 to 5000 lbs. per square inch, and higher.

The inclusion of a quantity of staple fiber glass with the continuous filament glass results in a rapid drop in tensile strength as the proportion of staple fiber is increased. In several tests made with a composite laminated material embodying approximately 50% staple fiber and 50% continuous filaments, the tensile strength of the composite material ranges from 28,300 lbs. per square inch to 30,600 lbs. per square inch. An all-staple glass fiber material would give values considerably lower than this. It will thus be seen that the use of an all-continuous filament fabric is necessary to obtain the highest tensile strengths. The inclusion of staple fiber does not appear to be of any marked benefit as far as strength is concerned. However, the precoating treatment does make staple fiber material suitable for electrical purposes.

The composite material prepared according to the foregoing represents a marked advance over the prior art in that heretofore plastic materials required steel inserts and similar expedients in order to obtain sufficient strength for many purposes. By following the procedure specified, it is possible to obtain a laminated phenolic material which has a tensile strength comparable to that of mild steel. Such material is suitable for many purposes for which plastic materials have been heretofore tried and found wanting. Airplane propellers, airplane structural parts, reaction vessels, and parts of apparatus of large size and which must withstand large loads and stresses, may be fabricated from the glass fiber phenolic resin produced by the foregoing process.

As a specific example of a member meeting unusual requirements which was prepared from the glass fiber bonded phenolic resin, reference should be had to Fig. 4. The member in Fig. 4 is a tie-rod for use in a circuit breaker mechanism disrupting a heavy circuit within a fraction of a cycle. The tie-rod is employed as a structural member in the disrupting mechanism. Extremely heavy loads and shock are applied to the material in such service. A high dielectric strength is required of the tie-rod. Prior to the development of the glass fiber bonded phenolic resin of this invention, no material known to the engineering art could meet these requirements.

The tie-rod 30 of Fig. 4 consists of a 1½ inch diameter rod 32 composed of fiber glass bonded in phenolic resin. At each end of the tie-rod are fitted steel ferrules 34. The ferrules are attached to the rod 32 by spinning one or more beads 36 into one or more grooves in the rod 32. Flanges 38 are provided on the ferrules 34. The total length of the member is approximately 20 inches, the minimum distance between the metal ferrules between 13–14 inches. When tested electrically, the member 30 withstood over 200 kilovolts at 60 cycles. The rod withstood successfully other severe electrical tests applied thereto. The tie rod was tested in tension and the steel ferrules broke without causing failure of the body 32. After improvement in design of the steel ferrules, the glass fiber phenolic resin body 32 failed.

Rods similar to 32, 24 inches in length, were supported at either end and an impact arm capable of delivering a 120 feet lb. blow was applied to the glass fiber phenolic resin rod. Several full impacts were taken by the body 32 without any sign of failure. This represented the full capacity of the impact testing machine available. Impact tests on small Charpy samples of ½ inch x ½ inch x 5 inches in length also were made. These samples were prepared from woven glass fabric laminated in superimposed layers. The average Charpy value edgewise to the layer of fabric averages 20 foot lbs. When the impact was applied flatwise to the fabric laminations, the average value was 28 foot lbs. This test indicates a significant advance in the art. It is believed that impact values of this order have not been procured from resin members heretofore prepared. It is believed that material possessing this shock resistance is of great value to the industry.

While glass fiber of a diameter of less than 0.002 inch is preferred for preparing high strength laminated members, the use of coarser glass wool in the manner disclosed by the invention may be desirable in many instances due to the lower cost of glass wool.

Since certain obvious changes may be made in the above procedures and different embodiments of the invention could be made without departing from the scope thereof, it is intended that all matter contained in the above description or taken in connection with the accompanying drawing, shall be interpreted as illustrative and not in a limiting sense.

I claim as my invention:

1. A molded laminated structure comprising a plurality of layers of a fabric composed of substantially all continuous glass fibers of 0.002 inch diameter or smaller, the glass fibers being coated with small amounts of amylaceous material, a coating of from 3% to 12% by weight of the fabric of an oil modified phenolic resin on the glass fibers, and a body of thermoset phenolic resin bonding the whole.

2. A molded heat treated laminated structure for use as an electrical insulator comprising, in combination, a plurality of layers of a substantially starch-free fabric composed of glass fiber of 0.001 inch diameter or smaller, a coating of from 3% to 12% by weight of the fabric of a phenolic resin modified with an oil selected from the group of tung oil and oiticica oil, the oil modified phenolic resin being characterized by good bonding to the glass fibers, and a body of phenolic resin bonding the whole.

3. An article of manufacture comprising, in combination, an unmodified, relatively infusible, thermoset phenolic resin, a fabric filler distributed in the phenolic resin to provide for high strength, the filler comprising substantially all continuous glass fibers of an average diameter of 0.00025 inch, a coating of an oil modified phenolic resin having a good bond with the glass fibers, a plasticizer in the oil modified phenolic resin, to provide for an elastic resin coating upon the glass fibers to permit relative fiber movement whereby stress distribution in the filler is obtained, the coating of oil modified phenolic resin bonding to the unmodified resin.

4. An article of manufacture comprising, in combination, an unmodified, relatively infusible, thermoset phenolic resin, a fabric filler distributed in the phenolic resin to provide for high strength, the filler comprising substantially all continuous glass fibers of an average diameter of 0.00025 inch, a coating on the glass fibers of an oil modified phenolic resin having a good bond with the glass fibers and from 1% to 15% of a plasticizer in the oil modified phenolic resin to provide for an elastic resin coating upon the glass fibers to permit relative fiber movement whereby stress distribution in the filler is obtained, the coating of the oil modified phenolic resin bonding to the unmodified resin.

5. An article of manufacture comprising, in combination, an unmodified, relatively infusible, thermoset phenolic resin, a filler distributed in the phenolic resin to provide for high strength, the filler comprising substantially all continuous glass fibers of an average diameter of 0.00025 inch, a coating on the glass fibers of an oil modified phenolic resin having a good bond with the glass fibers, the oil modified resin being the reaction product of from 2 to 6 parts of a phenol, one part of a modifying oil selected from tung oil and oiticica oil, and 1 to 55 parts of 40% formaldehyde solution or its equivalent and a plasticizer in the oil modified phenolic resin to provide for an elastic resin coating upon the glass fibers to permit relative fiber movement whereby stress distribution in the filler is obtained, the oil modified resin coating bonding to the unmodified resin.

6. An article of manufacture comprising, in combination, an unmodified, relatively infusible, thermoset phenolic resin, a fabric filler distributed in the phenolic resin to provide for high strength, the filler comprising substantially all continuous glass fibers of an average diameter of 0.00025 inch, the glass fibers having a starch coating, a coating in the glass fibers of an oil modified phenolic resin having a good bond with the glass fibers, a plasticizer in the oil modified phenolic resin to provide for an elastic resin coating upon the glass fibers to permit relative fiber movement whereby stress distribution in the filler is obtained, the coating bonding to the unmodified resin.

7. An article of manufacture comprising, in combination, an unmodified, relatively infusible, thermoset phenolic resin, a filler distributed in the phenolic resin to provide for high strength, the filler comprising substantially all continuous glass fibers of an average diameter of 0.00025 inch, the glass fibers having a starch coating and being woven, a coating of an oil modified phenolic resin having a good bond with the glass fibers, a plasticizer in the oil modified phenolic resin to provide for an elastic resin coating upon the glass fibers to permit relative fiber movement whereby stress distribution in the filler is obtained, the coating bonding to the unmodified resin.

8. The method of bonding a phenol-aldehyde resin to a glass fiber filler to provide for a good bond strength, resistance to delamination and an elastic embedding of the glass fibers which comprises initially coating the glass fibers with from 3% to 45% of their weight of a phenolic resin modified with an oil selected from the group consisting of tung oil and oiticica oil, applying the phenol-aldehyde resin to the coated glass fibers and consolidating the whole under heat and pressure.

9. The method of bonding a phenol-aldehyde resin to a glass fiber filler to provide for a good bond strength, resistance to delamination and an elastic embedding of the glass fibers which comprises initially coating the glass fibers with from 3% to 45% of their weight of a phenolic resin modified with an oil selected from the group consisting of tung oil and oiticica oil, from 1% to 15% of a plasticizer in the oil modified resin, applying the phenol-aldehyde resin to the coated glass fibers and consolidating the whole under heat and pressure.

10. The method of producing a high tensile strength laminated phenol-aldehyde resin member having good resistance to delamination, comprising, in combination, applying a coating of an oil modified phenolic resin prepared from two to six parts of phenol, part of an oil selected from the group of tung oil and oiticica oil and one to five parts of 40% formaldehyde solution to a fabric prepared from glass fibers of 0.0001 inch diameter and smaller, the resin having from 1% to 15% of a plasticizer, the glass fibers carrying small amounts of amylaceous material thereon, the oil modified resin comprising from 3% to 45% of the weight of the fabric and thereafter applying the thermosetting phenol-aldehyde resin and consolidating the whole under heat and pressure.

11. An article of manufacture comprising, in combination, a fabric composed of glass fibers, a phenol-aldehyde resinous material, and an elastic bonding material comprising an oil modified phenol-aldehyde capable of adhering to the glass fibers and compatible with the resinous material, the elastic bonding material cooperating to effect a substantially even distribution of applied stresses.

12. An article of manufacture comprising, in combination, a body composed of an elastic oil modified phenol-aldehyde type resin capable of adhering to glass fibers and a distribution of glass fibers of an average diameter of 0.00025 inch in and bonded to the oil modified resin, the glass fibers imparting to the body improved shock resistance and great tensile strength.

13. An article of manufacture comprising, in combination, a base material composed substantially entirely of continuous filament glass fibers, an adherent, elastic coating of an oil modified phenol-aldehyde resin applied to the base material, and a thermosetting phenol-aldehyde resin applied to the base material coated with the oil modified phenol-aldehyde resin, the elastic resin coating being compatible with and bonded to the phenol-aldehyde resin to provide for a distribution of stresses when a load is applied to the article whereby high strength is obtained.

14. An article of manufacture comprising, in combination, a base material composed substantially entirely of continuous filament glass fibers, a substance applied to the filaments to facilitate spinning and weaving, an adherent, elastic coating of an oil modified phenol-aldehyde resin applied to the base material, and a thermosetting phenol-aldehyde resin applied to the base material coated with the oil modified phenol-aldehyde resin, the elastic resin coating being compatible with and bonded to the phenol-aldehyde resin to provide for a distribution of stresses when a load is applied to the article whereby high strength is obtained.

15. An article of manufacture comprising, in combination, a base material composed substantially entirely of continuous filament glass fibers, a substance applied to the filaments to facilitate spinning and weaving, an adherent, elastic coating of an oil modified phenol-aldehyde resin applied to the base material, the oil modified phenol-aldehyde resin prepared from two to six parts of a phenol, one part of an oil selected from the group consisting of tung and oiticica oil, and one to five parts of 40% formaldehyde solution, and a thermosetting phenol-aldehyde resin applied to the base material coated with the oil modified phenol-aldehyde resin, the elastic resin coating being compatible with and bonded to the phenol-aldehyde resin to provide for a distribution of stresses when a load is applied to the article whereby high strength is obtained.

ROBERT W. AUXIER.